(12) United States Patent
Tanaka

(10) Patent No.: US 12,487,276 B2
(45) Date of Patent: Dec. 2, 2025

(54) ELECTRIC POWER MEASUREMENT CIRCUIT

(71) Applicant: Panasonic Intellectual Property Management Co., Ltd., Osaka (JP)

(72) Inventor: Kazuhito Tanaka, Shiga (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 146 days.

(21) Appl. No.: 18/424,405

(22) Filed: Jan. 26, 2024

(65) Prior Publication Data

US 2024/0255568 A1    Aug. 1, 2024

(30) Foreign Application Priority Data

Jan. 30, 2023    (JP) .................................. 2023-011906

(51) Int. Cl.
    *G01R 31/28* (2006.01)
(52) U.S. Cl.
    CPC ..... *G01R 31/2856* (2013.01); *G01R 31/2879* (2013.01); *G01R 31/2882* (2013.01)
(58) Field of Classification Search
    CPC ............... G01R 1/0491; G01R 31/265; G01R 31/3012; G01R 31/318511
    See application file for complete search history.

(56) References Cited

U.S. PATENT DOCUMENTS

| 2008/0293449 A1* | 11/2008 | Barlow | G06F 1/3203 |
| | | | 455/574 |
| 2012/0130657 A1* | 5/2012 | Eckert | G01R 31/2851 |
| | | | 702/61 |

FOREIGN PATENT DOCUMENTS

JP    2004062238 A    2/2004

* cited by examiner

*Primary Examiner* — Tung X Nguyen
(74) *Attorney, Agent, or Firm* — Seed Intellectual Property Law Group LLP

(57) ABSTRACT

An electric power measurement circuit includes: a period measurement circuit that measures a measurement period; a first measurer that measures (i) a first toggle number that is a number by which a signal value indicated by an input signal to a first target circuit has changed and (ii) a first operation period that is a period during which the input signal is valid; a second measurer that measures (i) a second toggle number that is a number by which a signal value indicated by an output signal from the first target circuit has changed and (ii) a second operation period that is a period during which the output signal is valid; and a calculator that calculates the first power consumption of the first target circuit based on the measured first toggle number, the measured first operation period, the measured second toggle number, and the measured second operation period.

8 Claims, 8 Drawing Sheets

ELECTRIC POWER MEASUREMENT CIRCUIT

CROSS REFERENCE TO RELATED APPLICATION

The present application is based on and claims priority of Japanese Patent Application No. 2023-011906 filed on Jan. 30, 2023.

FIELD

The present disclosure relates to an electric power measurement circuit that calculates power consumption in an integrated circuit including a plurality of processing circuits.

BACKGROUND

Patent Literature (PTL) 1 discloses a power consumption calculation method that measures the number of signal changes at gates included in a target logic circuit, and calculates the power consumption of the target logic circuit based on the number of signal changes that has been measured.

CITATION LIST

Patent Literature

PTL 1: Japanese Unexamined Patent Application Publication No. 2004-62238

SUMMARY

However, the power consumption calculation method according to PTL 1 can be improved upon.

In view of this, the present disclosure provides an electric power measurement circuit capable of improving upon the above related art.

An electric power measurement circuit according to one aspect of the present disclosure calculates power consumption in an integrated circuit including a plurality of processing circuits, and includes: a period measurement circuit that measures a measurement period; a first measurer that measures, in the measurement period, (i) a first toggle number that is a number by which a signal value indicated by a first input signal to a first target circuit among the plurality of processing circuits has changed and (ii) a first operation period that is a period during which the first input signal is valid; a second measurer that measures, in the measurement period, (i) a second toggle number that is a number by which a signal value indicated by a first output signal from the first target circuit has changed and (ii) a second operation period that is a period during which the first output signal is valid; and a calculator that calculates the first power consumption of the first target circuit based on the first toggle number and the first operation period measured in the measurement period by the first measurer and the second toggle number and the second operation period measured in the measurement period by the second measurer.

An electric power measurement circuit according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

Figure 1:
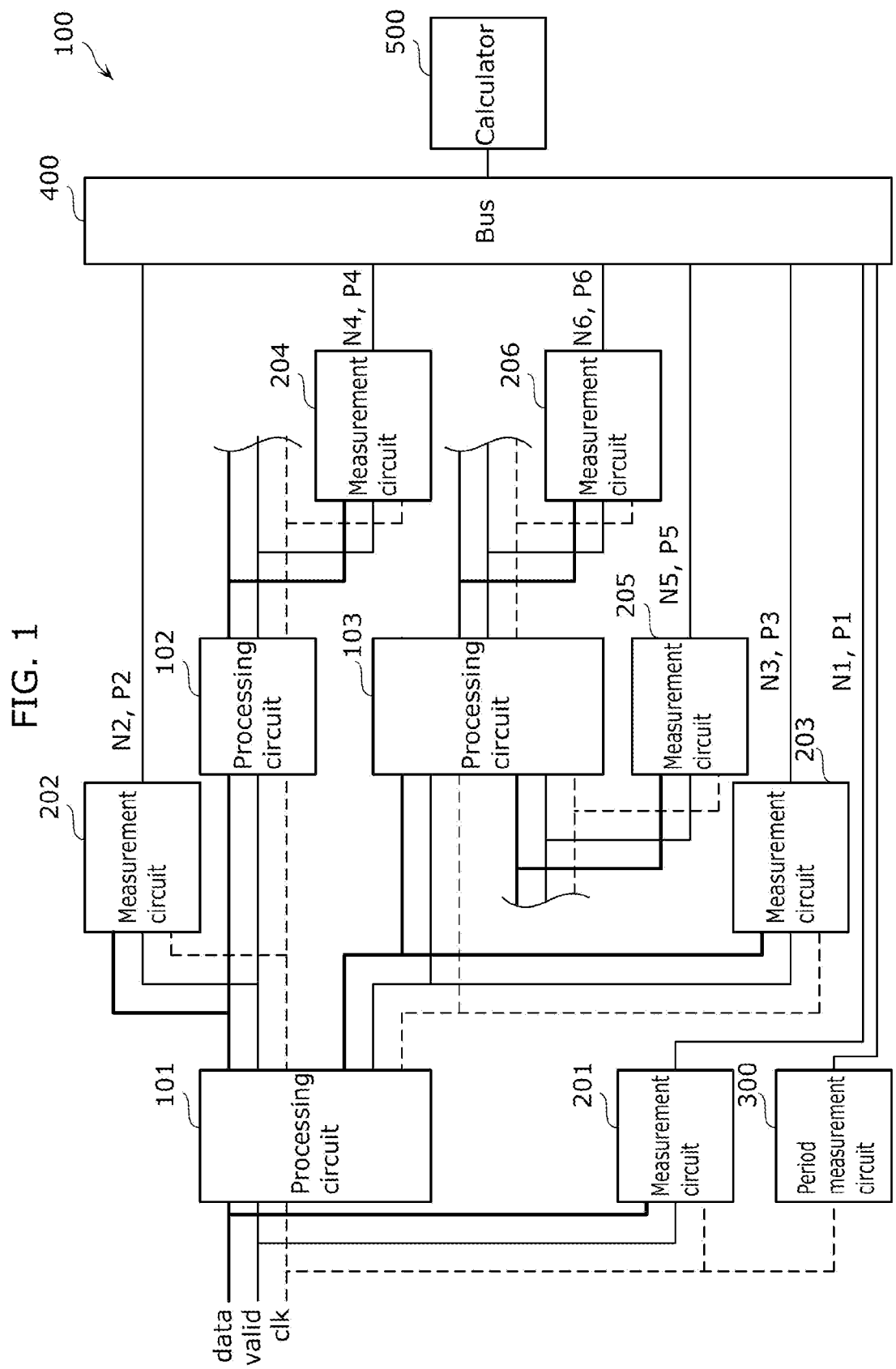
FIG. 1 is a block diagram illustrating one example of the configuration of an electric power measurement circuit according to an embodiment.

DESCRIPTION OF EMBODIMENT (Underlying Knowledge Forming Basis of the Present Disclosure)

An integrated circuit such as an on-board System on a Chip (SoC) has a circuit size that needs to be commensurate with a required performance. A dynamic power of an integrated circuit increases with an increase in its circuit size. The dynamic power also depends on how the integrated circuit is used. Different usages of the integrated circuit may result in significant differences in the dynamic power. It is difficult for vendors of integrated circuits to grasp how the integrated circuits will be used by users at the time of development of the integrated circuits. Therefore, the vendors develop the integrated circuits assuming that the integrated circuits will be used in such a manner as to maximize their power consumptions.

On the other hand, when a user performs an optimal thermal design for an integrated circuit adopted, the user needs to estimate power consumption commensurate with a function to be used by the user (i.e., usage). If the power consumption of each of circuits in an integrated circuit that is commensurate with the usage of the integrated circuit (software control) can be measured, optimization of the software control for reducing the power consumption of the entire integrated circuit can be realized. That is, it is desired to easily measure the power consumption of each of circuits in an integrated circuit.

However, it is difficult for related art such as PTL 1 described above to measure the power consumption of each of circuits in an integrated circuit. For example, there are problems with the related art.

For example, it is conceivable to measure an electric power at each power supply terminal of an integrated circuit by directly measuring a voltage and a current of the power supply terminal. However, its measurement environment is complicated and expensive. It is therefore difficult to prepare a plurality of such measurement environments. Moreover, measuring an electric power of an integrated circuit from its power supply terminals does not enable measurement of the power consumption of a specific circuit in the integrated circuit.

A conceivable technique other than the direct measurement is determining power consumption from a simulation based on information on circuits in an integrated circuit and use cases. However, the technique requires an enormous amount of time and an expensive environment and thus cannot be easily implemented. In addition, another conceivable technique is calculating an electric power by setting operation ratios derived from a user's past experience, using a table that is provided by a vendor of an integrated circuit and shows a relationship among an operating frequency, an operation ratio, and an electric power of each circuit block. However, there is a problem in reliability of the operation ratios set by the user from the experience, and the electric power is estimated to be large with the margin of power consumption in the worst conditions. That is, an electric power commensurate with actual operation ratios cannot be estimated, which increases the possibility that a thermal design is made to excess for an actual power consumption, causing a problem of increasing costs of the thermal design.

To overcome the above-described problems, an electric power measurement circuit according to the first aspect of the present disclosure calculates power consumption in an integrated circuit including a plurality of processing circuits, and includes: a period measurement circuit that measures a measurement period; a first measurer that measures, in the measurement period, (i) a first toggle number that is a number by which a signal value indicated by a first input signal to a first target circuit among the plurality of processing circuits has changed and (ii) a first operation period that is a period during which the first input signal is valid; a second measurer that measures, in the measurement period, (i) a second toggle number that is a number by which a signal value indicated by a first output signal from the first target circuit has changed and (ii) a second operation period that is a period during which the first output signal is valid; and a calculator that calculates the first power consumption of the first target circuit based on the first toggle number and the first operation period measured in the measurement period by the first measurer and the second toggle number and the second operation period measured in the measurement period by the second measurer.

Accordingly, the first power consumption of the first target circuit in the measurement period is calculated on the basis of the first toggle number and the first operation period measured based on the first input signal to the first target circuit and the second toggle number and the second operation period measured based on the first output signal from the first target circuit. That is, the first power consumption of the first target circuit in the integrated circuit can be easily calculated.

An electric power measurement circuit according to the second aspect of the present disclosure is the electric power measurement circuit according to the first aspect, further including: a third measurer that measures, in the measurement period, (i) a third toggle number that is a number by which a signal value indicated by a second input signal to a second target circuit among the plurality of processing circuits has changed and (ii) a third operation period that is a period during which the second input signal is valid; and a fourth measurer that measures, in the measurement period, (i) a fourth toggle number that is a number by which a signal value indicated by a second output signal from the second target circuit has changed and (ii) a fourth operation period that is a period during which the second output signal is valid. The calculator calculates also the second power consumption of the second target circuit based on the third toggle number and the third operation period measured in the measurement period by the third measurer and the fourth toggle number and the fourth operation period measured in the measurement period by the fourth measurer.

Accordingly, the second power consumption of the second target circuit in the measurement period is calculated on the basis of the third toggle number and the third operation period measured based on the second input signal to the second target circuit and the fourth toggle number and the fourth operation period measured based on the second output signal from the second target circuit. That is, the second power consumption of the second target circuit in the integrated circuit can be easily calculated. In this manner, the power consumptions of the plurality of processing circuits can be easily calculated.

An electric power measurement circuit according to the third aspect of the present disclosure is the electric power measurement circuit according to the first aspect, further including: a fourth measurer that measures, in the measurement period, (i) a fourth toggle number that is a number by which a signal value indicated by a second output signal from a second target circuit has changed and (ii) a fourth operation period that is a period during which the second output signal is valid, the second target circuit being a circuit to which the first output signal is input as an input signal among the plurality of processing circuits. The calculator calculates also the second power consumption of the second target circuit based on the second toggle number and the second operation period measured in the measurement period by the second measurer and the fourth toggle number and the fourth operation period measured in the measurement period by the fourth measurer.

Accordingly, the second power consumption of the second target circuit is calculated using the second toggle number and the second operation period measured based on the first output signal from the first target circuit. Thus, the number of measurers that measure toggle numbers and operation periods can be reduced.

An electric power measurement circuit according to the fourth aspect of the present disclosure is the electric power measurement circuit according to the first aspect, wherein the period measurement circuit includes: a counter that when a clock signal and a measurement start signal are input to the period measurement circuit, counts the clock signal after the measurement start signal has been input; and a first outputter that when the clock signal, a count result obtained by the counter, and a measurement end signal are input to the period measurement circuit, outputs, as the measurement period, the count result at a point in time when the measurement end signal is input to the period measurement circuit.

An electric power measurement circuit according to the fifth aspect of the present disclosure is the electric power measurement circuit according to any one of the first aspect through the fourth aspect, wherein each of the first measurer and the second measurer includes: a holding circuit that holds a first signal value that is the signal value of the first input signal or the first output signal in a first clock cycle; a toggle bit counter that counts a total number of bits that are different between the first signal value and a second signal value, where the second signal value is a signal value of the first input signal or the first output signal in a second clock cycle following the first clock cycle; a mask processor that executes a masking process on a count result indicating that the first input signal or the first output signal is invalid among count results obtained by the toggle bit counter; a valid bit counter that counts the count result on which the masking process is executed by the mask processor; a valid period counter that counts a period during which the first input signal or the first output signal is valid; and a second outputter that outputs, as the first toggle number or the second toggle number, the result of counting valid bits by the valid bit counter and outputs, as the first operation period or the second operation period, the result of counting a valid period by the valid period counter.

Accordingly, the valid bit counter that measures the toggle number and the valid period counter that counts the operation period are separately provided. Thus, the toggle number and the operation period in the same measurement period can be measured. As a result, the first power consumption of the first target circuit can be calculated with higher accuracy.

An electric power measurement circuit according to the sixth aspect of the present disclosure is the electric power measurement circuit according to any one of the first aspect through the fourth aspect, wherein each of the first measurer and the second measurer includes: a holding circuit that holds a first signal value that is the signal value of the first input signal or the first output signal in a first clock cycle; a toggle bit counter that compares the first signal value with a second signal value that is a signal value of the first input signal or the first output signal in a second clock cycle following the first clock cycle, and counts a total number of bits that are different between the first signal value and the second signal value; a mask processor that executes a masking process on a count result indicating that the first input signal or the first output signal is invalid among count results obtained by the toggle bit counter; a first switch that switches between a first count mode and a second count mode; a validity counter that counts the count result masked by the mask processor in a first measurement period that is the first count mode, and counts a period during which the first input signal or the first output signal is valid in a second measurement period that is the second count mode; and a second outputter that outputs, as the first toggle number or the second toggle number, the result of counting valid bits by the validity counter in the first measurement period, and outputs, as the first operation period or the second operation period, the result of counting a valid period by the validity counter in the second measurement period.

Accordingly, the counter that measures the toggle number and the counter that measures the operation period can be unified. As a result, a circuit size of the electric power measurement circuit can be reduced.

An electric power measurement circuit according to the seventh aspect of the present disclosure is the electric power measurement circuit according to any one of the first aspect through the sixth aspect, wherein the first measurer and the second measurer are included in a first measurement circuit. The electric power measurement circuit further includes a second switch that switches between a first operation mode of connecting the first measurement circuit and the input side of the first target circuit and a second operation mode of connecting the first measurement circuit and the output side of the first target circuit. The first measurement circuit operates as the first measurer in the first operation mode and operates as the second measurer in the second operation mode.

Accordingly, the first measurer and the second measurer can be unified into the first measurement circuit. As a result, a circuit size of the electric power measurement circuit can be reduced.

An electric power measurement circuit according to the eighth aspect of the present disclosure is the electric power measurement circuit according to any one of the first aspect through the sixth aspect, wherein the electric power measurement circuit further includes: a third measurer that measures, in the measurement period, (i) a third toggle number that is a number by which a signal value indicated by a second input signal to a second target circuit among the plurality of processing circuits has changed and (ii) a third operation period that is a period during which the second input signal is valid; and a fourth measurer that measures, in the measurement period, (i) a fourth toggle number that is a number by which a signal value indicated by a second output signal from the second target circuit has changed and (ii) a fourth operation period that is a period during which the second output signal is valid. Two measurers among the first measurer, the second measurer, the third measurer, and the fourth measurer are respectively included in a first measurement circuit and a second measurement circuit. The electric power measurement circuit further includes a selector that respectively connects, to the first measurement circuit and the second measurement circuit, two measurement targets among the input side of the first target circuit, the output side of the first target circuit, the input side of the second target circuit, and the output side of the second target circuit. The first measurement circuit and the second measurement circuit operate as measurers that measure the two measurement targets selected by the selector.

Accordingly, the first measurement circuit and the second measurement circuit can be set to function as two measurers selected from among the first measurer, the second measurer, the third measurer, and the fourth measurer. Therefore, for example, by setting the first measurement circuit and the second measurement circuit to function as the first measurer and the second measurer, the first power consumption of the first target circuit can be calculated based on the first toggle number, the first operation period, the second toggle number, and the second operation period in the same measurement period. As a result, it may be possible to calculate the first power consumption of the first target circuit with higher accuracy. For example, by setting the first measurement circuit and the second measurement circuit to function as the third measurer and the fourth measurer, it may be possible to calculate the second power consumption of the second target circuit with higher accuracy as with the first target circuit.

Hereinafter, an embodiment will be described in detail with reference to the drawings.

The following embodiments are each a general or specific example of the present disclosure. The numerical values, shapes, materials, elements, arrangement and connection of the elements, steps, orders of steps, etc. described in the following embodiments are merely examples, and do not intend to limit the present disclosure. Among elements described in the following embodiments, those not recited in any one of the independent claims that indicate the broadest concepts are described as optional elements. The figures are schematic diagrams and are not necessarily precise illustrations. The figures are therefore not necessarily to scale, for example. In each figure, the same components are designated by the same reference signs.

EMBODIMENT

[Configuration]

FIG. 1 is a block diagram illustrating one example of the configuration of an electric power measurement circuit according to an embodiment.

As illustrated in FIG. 1, electric power measurement circuit 100 includes a plurality of (three in the present embodiment) processing circuits 101 to 103, a plurality of measurement circuits 201 to 206, period measurement circuit 300, bus 400, and calculator 500. Electric power measurement circuit 100 may include another processing circuit in addition to the plurality of processing circuits 101 to 103. Electric power measurement circuit 100 may include another measurement circuit in addition to the plurality of measurement circuits 201 to 206.

Each of the plurality of processing circuits 101 to 103 is a logic circuit or a processor that performs a process in accordance with a signal being input, and outputs a processing result. For example, processing circuit 101 receives an input signal on one system, a valid signal, and a clock signal, and outputs output signals on two systems. The output signals on the two systems are signals that are generated by processing circuit 101 performing a process on the input signal on the one system input into processing circuit 101. Processing circuit 101 may output the valid signal and clock signal received as they are. Processing circuit 101 is one example of a first target circuit.

For example, processing circuit 102 receives an input signal on one system, a valid signal, and a clock signal, and outputs an output signal on one system. The input signal on the one system input into processing circuit 102 is an output signal on one system from among the output signals on the two systems output from processing circuit 101. The output signal on the one system output from processing circuit 102 is a signal that is generated by processing circuit 102 performing a process on the input signal on the one system input into processing circuit 102. Processing circuit 102 may output the valid signal and clock signal received as they are.

For example, processing circuit 103 receives input signals on two systems, a valid signal, and a clock signal, and outputs an output signal on one system. An input signal on one system from among the input signals on the two systems input into processing circuit 103 is an output signal on one system from among the output signals on the two systems output from processing circuit 101 and is an output signal other than the output signal output to processing circuit 102. The output signal on the one system output from processing circuit 103 is a signal that is generated by processing circuit 103 performing a process on the input signals on the two systems input into processing circuit 103. Processing circuit 103 may output the valid signal and clock signal received as they are.

Measurement circuits 201 to 206 measure an operation period and a toggle number of a signal being a measurement target. The toggle number is a number by which a signal value indicated by the signal being a measurement target has changed. The operation period is a period during which the signal being a measurement target is valid.

Figure 2:
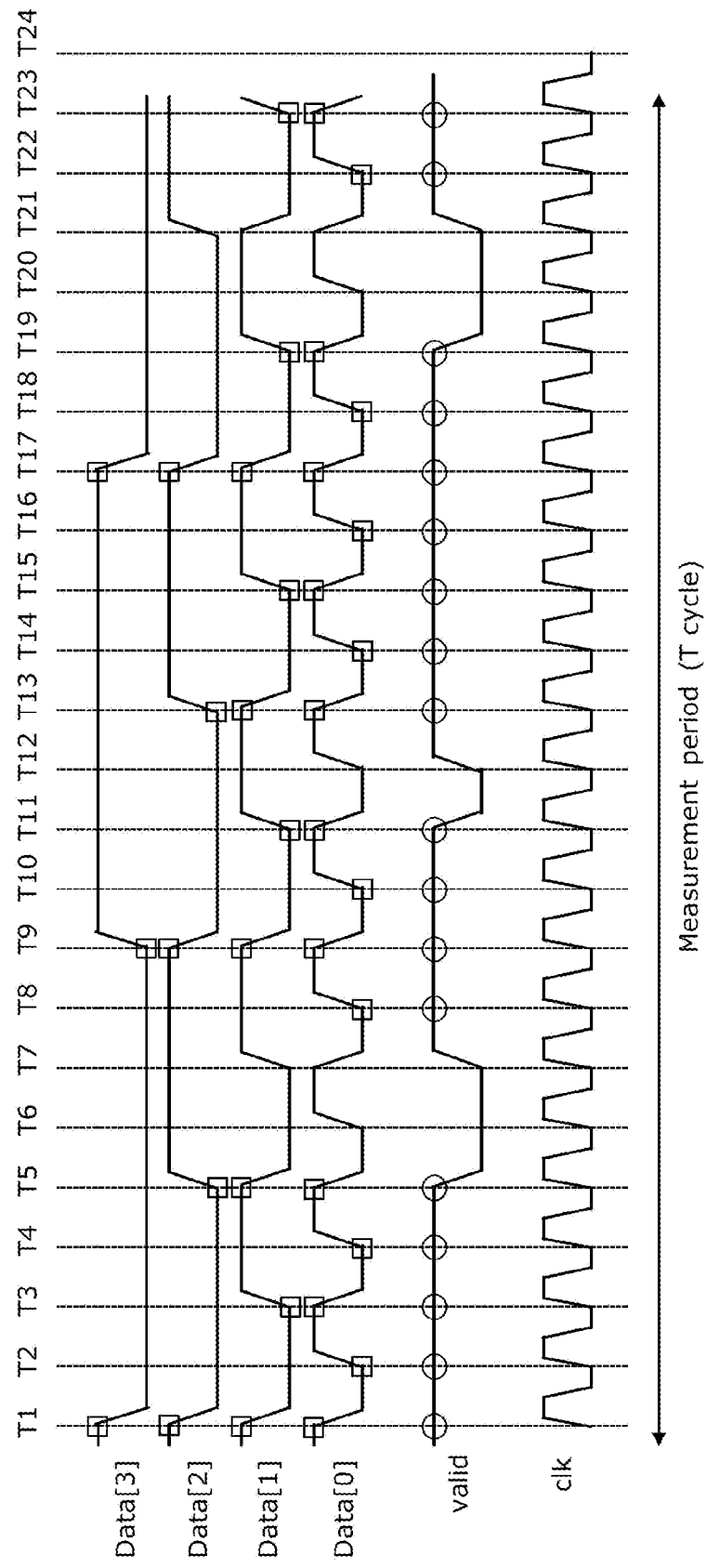
FIG. 2 is a chart for describing a toggle number and an operation period.

FIG. 2 is a chart for describing the toggle number and the operation period.

In FIG. 2, Data[0] to Data[3] indicate the signal value of the signal being a measurement target. In FIG. 2, the signal being a measurement target is represented in four bits, and each of the bits indicates a signal that is a corresponding one of Data[0] to Data[3]. valid indicates a signal value of the valid signal. valid being High indicates that the signal being a measurement target is valid, and valid being Low indicates that the signal being a measurement target is invalid. clk indicates the clock signal. FIG. 2 illustrates 23 times of operation from time point T1 to time point T23 with a predetermined clock.

The toggle number is a total number of times the bits being Data[0] to Data[3] change when the valid signal indicates valid. In FIG. 2, time points at which each of the bits changes are indicated with squares. That is, in the example illustrated in FIG. 2, the toggle number is a total number of the squares. A toggle ratio is a proportion of the toggle number to a total number of clock pulses with which the bits can change. The total number of clock pulses is specifically a number obtained by multiplying a measurement period by the number of the bits. In this manner, when the toggle number and the measurement period are known, the toggle ratio can be calculated with the number of the bits of the signals, which is a known value.

In the example illustrated in FIG. 2, the number of bits, namely, the number of Data[0] of Data[3] is four, and the measurement period is 23. Thus, the total number of clock pulses is 23×4, 92. In this manner, the total number of clock pulses can be calculated from the measurement period and the number of bits of the signal being a measurement target. The toggle number is 36. Thus, the toggle ratio can be calculated as 36/92=0.39 . . . .

The operation period is the number of cycles of the clock signal with the valid signal being valid. In FIG. 2, time points at which the valid signal indicates valid are indicated with circles. That is, in the example illustrated in FIG. 2, the operation period is a total number of the circles. The operation period can be indicated as the number of the circles because the clock oscillates with a predetermined clock period, and because the measurement period can be calculated by multiplying the number of the circles by the predetermined clock period. An operation ratio is a proportion of the operation period to the measurement period. In this manner, when the operation period and the measurement period are known, the operation ratio can be calculated.

In the example illustrated in FIG. 2, the measurement period is 23 from T1 to T23, and the operation period is 18. Thus, the operation ratio can be calculated as 18/23= 0.78 . . . .

Here, refer back to the description of FIG. 1.

Measurement circuit 201 is connected to an input side of processing circuit 101 and receives the input signal on the one system input into processing circuit 101, the valid signal, and the clock signal. In the measurement period, measurement circuit 201 measures toggle number N1, which is a number by which a signal value indicated by the input signal into processing circuit 101 (a first input signal) has changed, and operation period P1, which is a period during which the input signal is valid. Measurement circuit 201 is one example of a first measurer. Toggle number N1 is one example of a first toggle number. Operation period P1 is one example of a first operation period.

Measurement circuit 202 is connected to an output side of processing circuit 101 and receives the output signal on the one system output to processing circuit 102 (a first output signal) from among the output signals on the two systems output from processing circuit 101, the valid signal, and the clock signal. In the measurement period, measurement circuit 202 measures toggle number N2, which is a number by which a signal value indicated by the output signal from processing circuit 101 to processing circuit 102 (the first output signal) has changed, and operation period P2, which is a period during which the output signal is valid. It should be noted that the output signal from processing circuit 101 to processing circuit 102 is also an input signal into processing circuit 102. Therefore, toggle number N2 and operation period P2 can be considered to be results of measurement of the input signal into processing circuit 102. Measurement circuit 202 is one example of a second measurer. Toggle number N2 is one example of a second toggle number. Operation period P2 is one example of a second operation period.

Measurement circuit 203 is connected to the output side of processing circuit 101 and receives the output signal on the one system output to processing circuit 103 from among the output signals on the two systems output from processing circuit 101, the valid signal, and the clock signal. In the measurement period, measurement circuit 203 measures toggle number N3, which is a number by which a signal value indicated by the output signal from processing circuit 101 to processing circuit 103 has changed, and operation period P3, which is a period during which the output signal is valid. It should be noted that the output signal from processing circuit 101 to processing circuit 103 is also an input signal into processing circuit 103. Therefore, toggle number N3 and operation period P3 can be considered to be results of measurement of the input signal into processing circuit 103.

Measurement circuit 204 is connected to an output side of processing circuit 102 and receives the output signal on the one system output from processing circuit 102, the valid signal, and the clock signal. In the measurement period, measurement circuit 204 measures toggle number N4, which is a number by which a signal value indicated by the output signal from processing circuit 102 has changed, and operation period P4, which is a period during which the output signal is valid. Toggle number N4 is one example of a fourth toggle number. Operation period P4 is one example of a fourth operation period.

Measurement circuit 205 is connected to an input side of processing circuit 103 and receives the input signal on the one system input into processing circuit 103 from among the input signals on the two systems input into processing circuit 103, the valid signal, and the clock signal. The input signal on the one system received by measurement circuit 205 is an input signal other than the input signal on the one system from processing circuit 101 from among the input signals on the two systems input into processing circuit 103. In the measurement period, measurement circuit 205 measures toggle number N5, which is a number by which a signal value indicated by the input signal into processing circuit 103 has changed, and operation period P5, which is a period during which the input signal is valid.

Measurement circuit 206 is connected to an output side of processing circuit 103 and receives the output signal on the one system output from processing circuit 103, the valid signal, and the clock signal. In the measurement period, measurement circuit 206 measures toggle number N6, which is a number by which a signal value indicated by the output signal from processing circuit 103 has changed, and operation period P6, which is a period during which the output signal is valid.

The configuration of the plurality of measurement circuits 201 to 206 will be described later in detail.

Period measurement circuit 300 measures the measurement period. Period measurement circuit 300 receives the clock signal and a control signal. The control signal includes a measurement start signal and a measurement end signal. The measurement start signal is a signal that indicates a start timing (a start cycle) of the measurement period. The measurement end signal is a signal that indicates an end timing (an end cycle) of the measurement period. Period measurement circuit 300 measures the measurement period by counting clock pulses from the start timing indicated by the measurement start signal to the end timing indicated by the measurement end signal. That is, the measurement period is indicated as the clock pulses from the start timing to the end timing. The configuration of period measurement circuit 300 will be described later in detail.

Results of measurement by measurement circuits 201 to 206 and a result of measurement obtained by period measurement circuit 300 are output to calculator 500 via bus 400.

Calculator 500 calculates power consumption of the processing circuits in the measurement period based on results of measurement obtained by the measurement circuits connected to input sides of the processing circuits and results of measurement obtained by the measurement circuits connected to output sides of the processing circuits. Calculator 500 may measure the power consumption of the entire circuit based on toggle numbers N1 to N6 and operation periods P1 to P6 that are obtained under various operation conditions of electric power measurement circuit 100.

Calculator 500 calculates the power consumption of processing circuit 101 based on toggle number N1 and operation period P1 measured by measurement circuit 201 in the measurement period, toggle number N2 and operation period P2 measured by measurement circuit 202 in the measurement period, and toggle number N3 and operation period P3 measured by measurement circuit 203 in the measurement period. Likewise, calculator 500 calculates the power consumption of processing circuit 102 based on toggle number N2 and operation period P2 measured by measurement circuit 202 in the measurement period and toggle number N4 and operation period P4 measured by measurement circuit 204 in the measurement period. Likewise, calculator 500 calculates the power consumption of processing circuit 103 based on toggle number N3 and operation period P3 measured by measurement circuit 203 in the measurement period, toggle number N5 and operation period P5 measured by measurement circuit 205 in the measurement period, and toggle number N6 and operation period P6 measured by measurement circuit 206 in the measurement period.

Calculator 500 calculates power consumption in a processing circuit being a measurement target with an electric-power calculating equation with regression coefficients obtained by a multiple regression analysis on the basis of toggle ratios calculated based on toggle numbers of the processing circuit being a measurement target on its input side and its output side and an operation ratio calculated based on the operation periods. For example, electric power PW1 calculated from a toggle ratio of processing circuit 101 on its input side and an operation ratio, electric power PW2 calculated from a toggle ratio of processing circuit 101 on its output side and the operation ratio, and electric power PW3 calculated from a toggle ratio of processing circuit 101 on its output side on another system and the operation ratio are calculated by the following equations. Note that kn1, kn2, kn3, kp1, kp2, and kp3 are the regression coefficients.

$$PW1 = kn1 \times N1 + kp1 \times P1$$

$$PW2 = kn2 \times N2 + kp2 \times P2$$

$$PW3 = kn3 \times N3 + kp3 \times P3$$

Power consumption PW of processing circuit 101 is then calculated by the following equation.

$$PW = PW1 + PW2 + PW3$$

Note that the regression coefficients can be calculated by producing a plurality of different operating states of the circuit, measuring an electric power of the entire circuit in each of the operating states at an external power supply terminal of an SoC, obtaining, at the same time, the toggle ratio and the operation ratio of the input side of processing circuit 101, the toggle ratio and the operation ratio of the output side of processing circuit 101, and the toggle ratio and the operation ratio of the output side of processing circuit 101 on the other system, and performing the multiple regression analysis on the data obtained.

Note that calculator 500 is implemented with a processor that is built in electric power measurement circuit 100. Calculator 500 may be implemented with a computer outside electric power measurement circuit 100.

Next, a specific configuration of measurement circuits 201 to 206 will be described. Note that measurement circuits 201 to 206 have the same configuration. Therefore, the configuration of measurement circuit 201 will be described as a representative configuration.

Figure 3:
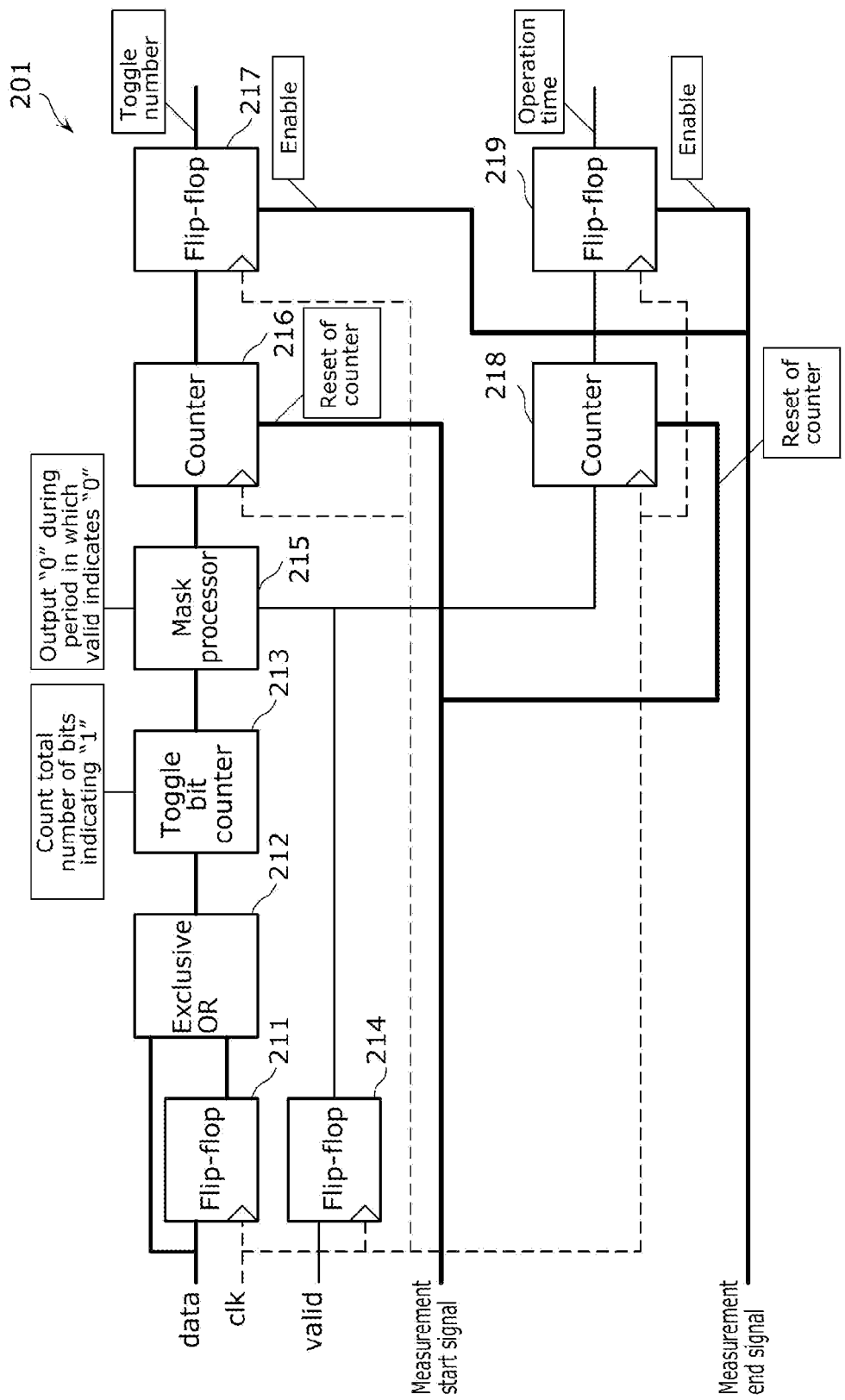
FIG. 3 is a block diagram illustrating one example of the configuration of a measurement circuit.

FIG. 3 is a block diagram illustrating one example of the configuration of the measurement circuit.

Measurement circuit 201 includes flip-flop 211, exclusive OR 212, toggle bit counter 213, flip-flop 214, mask processor 215, counter 216, flip-flop 217, counter 218, and flip-flop 219.

Flip-flop 211 is a holding circuit that holds a first signal value that is a signal value indicated by a signal being a measurement target in a first clock cycle. For example, the signal value indicated by the signal being a measurement target is represented in four bits. It should be noted that the signal value may be represented in any number of bits larger than or equal to one bit. Flip-flop 211 outputs the first signal value held in the next clock cycle.

Exclusive OR 212 obtains the first signal value held by flip-flop 211 and a second signal value that is a signal value indicated by the signal being a measurement target in a second clock cycle following the first clock cycle, and outputs a result of comparison between the first signal value and the second signal value. For example, exclusive OR 212 compares the first signal value and the second signal value, outputs "1" for a bit that is different between the first signal value and the second signal value, and outputs "0" for a bit that is the same between the first signal value and the second signal value.

Toggle bit counter 213 counts the number of "1" included in a value output by exclusive OR 212, namely, a total number of bits that are different between the first signal value and the second signal value.

Flip-flop 214 holds a signal value of the valid signal in the first clock cycle. Flip-flop 214 outputs the signal value held in the next clock cycle.

Mask processor 215 executes a masking process on a count result obtained by toggle bit counter 213 when the signal value of the valid signal output from flip-flop 214 is "0" in the first clock cycle. That is, mask processor 215 masks a count result indicating that the signal being a measurement target is invalid among count results obtained by toggle bit counter 213. Specifically, in the masking process, mask processor 215 sets a count result obtained by toggle bit counter 213 to 0 and outputs the count result when the signal value of the valid signal output from flip-flop 214 is "0" in the first clock cycle and does not change the count result obtained by toggle bit counter 213 and outputs the count result as it is when the signal value of the valid signal is "1".

Counter 216 counts the count result on which mask processor 215 executes the masking process. That is, counter 216 counts the number of times the bits being Data[0] to Data[3] change when the valid signal indicates valid. Counter 216 resets its counter at the start timing of measurement indicated by the measurement start signal, counts the count result after the start timing of measurement, and outputs the count result to flip-flop 217. Counter 216 is one example of a valid bit counter.

Flip-flop 217 holds the count result obtained by counter 216 and outputs the count result at the end timing of measurement indicated by the measurement end signal. Accordingly, flip-flop 217 outputs a result of counting valid bits counted by counter 216 in the measurement period, as the toggle number. Flip-flop 217 is one example of an outputter.

Counter 218 counts a period during which the signal value of the valid signal is "1" (i.e., a period during which the signal being a measurement target is valid). Counter 218 resets its counter at the start timing of measurement indicated by the measurement start signal, counts the period during which the signal being a measurement target is valid after the start timing of measurement, and outputs the count result to flip-flop 219. Counter 218 is one example of a valid period counter.

Flip-flop 219 holds the count result obtained by counter 218 and outputs the count result at the end timing of measurement indicated by the measurement end signal. Accordingly, flip-flop 219 outputs a result of counting a valid period counted by counter 218 in the measurement period, as the operation period. Flip-flop 219 is one example of a second outputter.

Next, a specific configuration of period measurement circuit 300 will be described.

Figure 4:
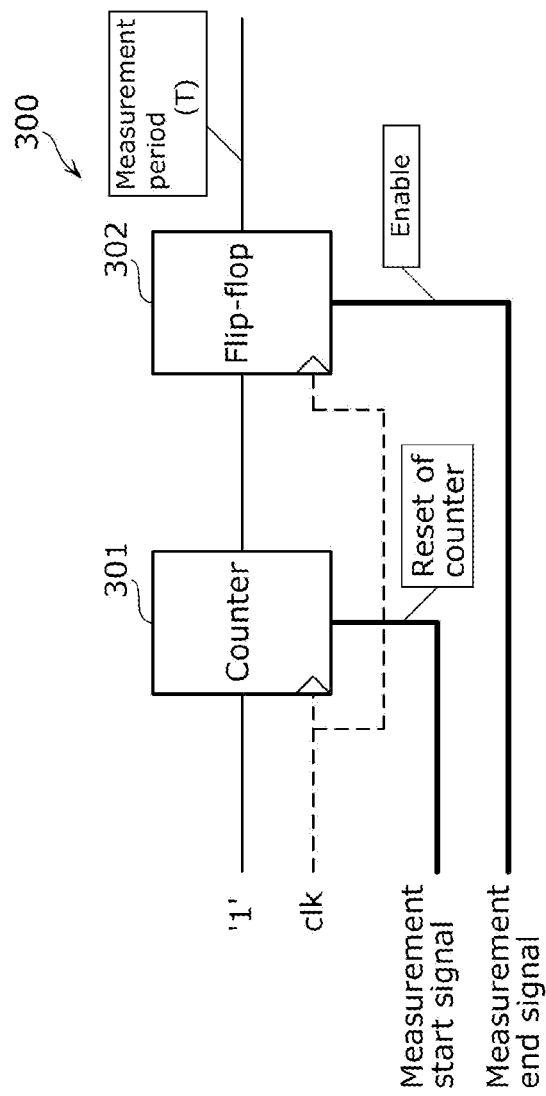
FIG. 4 is a block diagram illustrating one example of the configuration of a period measurement circuit.

FIG. 4 is a block diagram illustrating one example of the configuration of the period measurement circuit.

Period measurement circuit 300 includes counter 301 and flip-flop 302.

Counter 301 receives a signal indicating "1", the clock signal, and the measurement start signal. Counter 301 resets its counter at the start timing of measurement indicated by the measurement start signal, counts clock pulses after the start timing of measurement, and outputs a count result to flip-flop 302.

Flip-flop 302 holds the count result obtained by counter 301 and outputs the count result at the end timing of measurement indicated by the measurement end signal. Accordingly, flip-flop 302 outputs the count result counted by counter 301 as measurement period T. Flip-flop 302 is one example of a first outputter.

Figure 5:
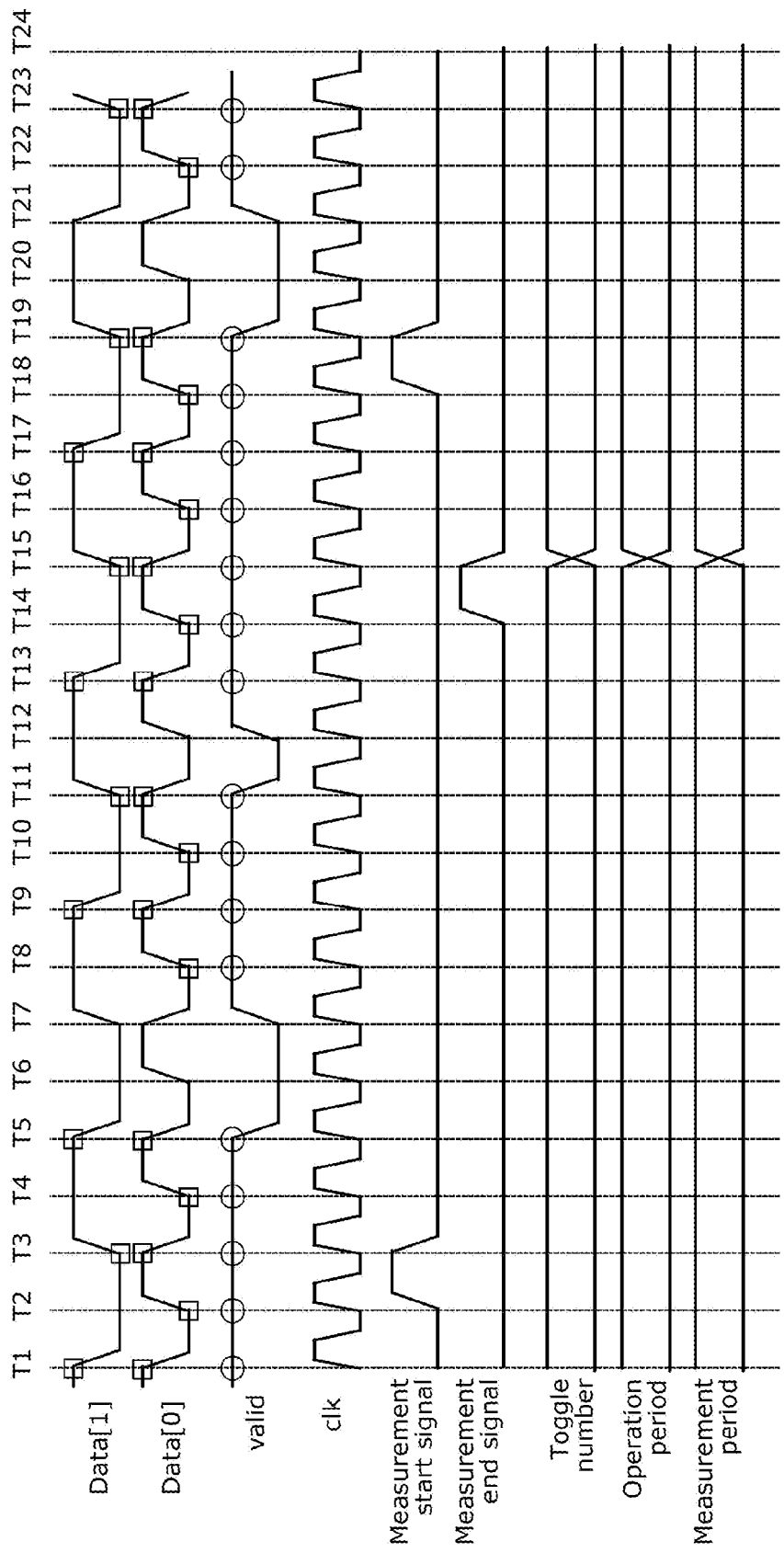
FIG. 5 is a chart for describing a timing at which a toggle number, an operation period, and a measurement period are determined.

FIG. 5 is a chart for describing a timing at which the toggle number, the operation period, and the measurement period are determined.

As illustrated in FIG. 5, the measurement end signal indicates the end timing of measurement at time point T15. Thus, the toggle number, the operation period, and the measurement period are determined at time point T15.

Advantageous Effects, Etc

Electric power measurement circuit 100 according to the present embodiment is an electric power measurement circuit that calculates power consumption in an integrated circuit including a plurality of processing circuits 101 to 103. Electric power measurement circuit 100 includes period measurement circuit 300, a plurality of measurement circuits 201 to 206, and calculator 500. Period measurement circuit 300 measures a measurement period. Measurement circuit 201 measures, in the measurement period, toggle number N1 that is a number by which a signal value indicated by an input signal to processing circuit 101 (a first target circuit) among the plurality of processing circuits 101 to 103 has changed and operation period P1 that is a period during which the input signal is valid. Measurement circuit 202 measures, in the measurement period, toggle number N2 that is a number by which a signal value indicated by an output signal from processing circuit 101 has changed and operation period P2 that is a period during which the output signal is valid. Measurement circuit 203 measures, in the measurement period, toggle number N3 that is a number by which a signal value indicated by an output signal from processing circuit 101 has changed and operation period P3 that is a period during which the output signal is valid. Calculator 500 calculates the power consumption of processing circuit 101 based on toggle number N1 and operation period P1 measured in the measurement period by measurement circuit 201, toggle number N2 and operation period P2 measured in the measurement period by measurement circuit 202, and toggle number N3 and operation period P3 measured in the measurement period by measurement circuit 203.

Accordingly, the power consumption of processing circuit 101 in the measurement period is calculated on the basis of toggle number N1 and operation period P1 measured based on the input signal into processing circuit 101, toggle number N2 and operation period P2 measured based on the output signal from processing circuit 101, and toggle number N3 and operation period P3 measured based on the output signal from processing circuit 101 on the other system. That is, a first power consumption of processing circuit 101 in the integrated circuit can be easily calculated.

In electric power measurement circuit 100 according to the present embodiment, measurement circuit 204 measures, in the measurement period, toggle number N4 that is a number by which a signal value indicated by an output signal from processing circuit 102 has changed and operation period P4 that is a period during which the output signal is valid, processing circuit 102 being a circuit to which an output signal of processing circuit 101 on one system is input as an input signal among the plurality of processing circuits 101 to 103. Calculator 500 calculates also the power consumption of processing circuit 102 based on toggle number N2 and operation period P2 measured in the measurement period by measurement circuit 202 and toggle number N4 and operation period P4 measured in the measurement period by measurement circuit 204.

Accordingly, the power consumption of processing circuit 102 is calculated using toggle number N2 and operation period P2 measured based on the output signal from processing circuit 101 on one system. Thus, the number of measurement circuits that measure toggle numbers and operation periods can be reduced.

In electric power measurement circuit 100 according to the present embodiment, each of measurement circuits 201 to 206 includes flip-flop 211 (a holding circuit), toggle bit counter 213, mask processor 215, counter 216 (a valid bit counter), counter 218 (a valid period counter), and flip-flops 217 and 219 (second outputters). Flip-flop 211 holds a first signal value that is a signal value of a signal being a measurement target in a first clock cycle. Toggle bit counter 213 counts a total number of bits that are different between the first signal value and a second signal value, the second signal value being a signal value of the signal being a measurement target in a second clock cycle following the first clock cycle. Mask processor 215 executes a masking process on a count result indicating that the signal being a measurement target is invalid among count results obtained by toggle bit counter 213. Counter 216 counts the count result on which the masking process is executed by mask processor 215. Counter 218 counts a period during which the signal being a measurement target is valid. Flip-flops 217 and 219 output, as a toggle number, a result of counting valid bits by counter 216 and outputs, as an operation period, a result of counting a valid period by counter 218 in the measurement period.

Accordingly, counter 216 (the valid bit counter) that measures the toggle number and counter 218 (the valid period counter) that counts the operation period are separately provided. Thus, the toggle number and the operation period in the same measurement period can be measured. As a result, the first power consumption of the first target circuit can be calculated with higher accuracy.

Variation 1

Measurement circuit 201A according to Variation 1 will be described.

Figure 6:
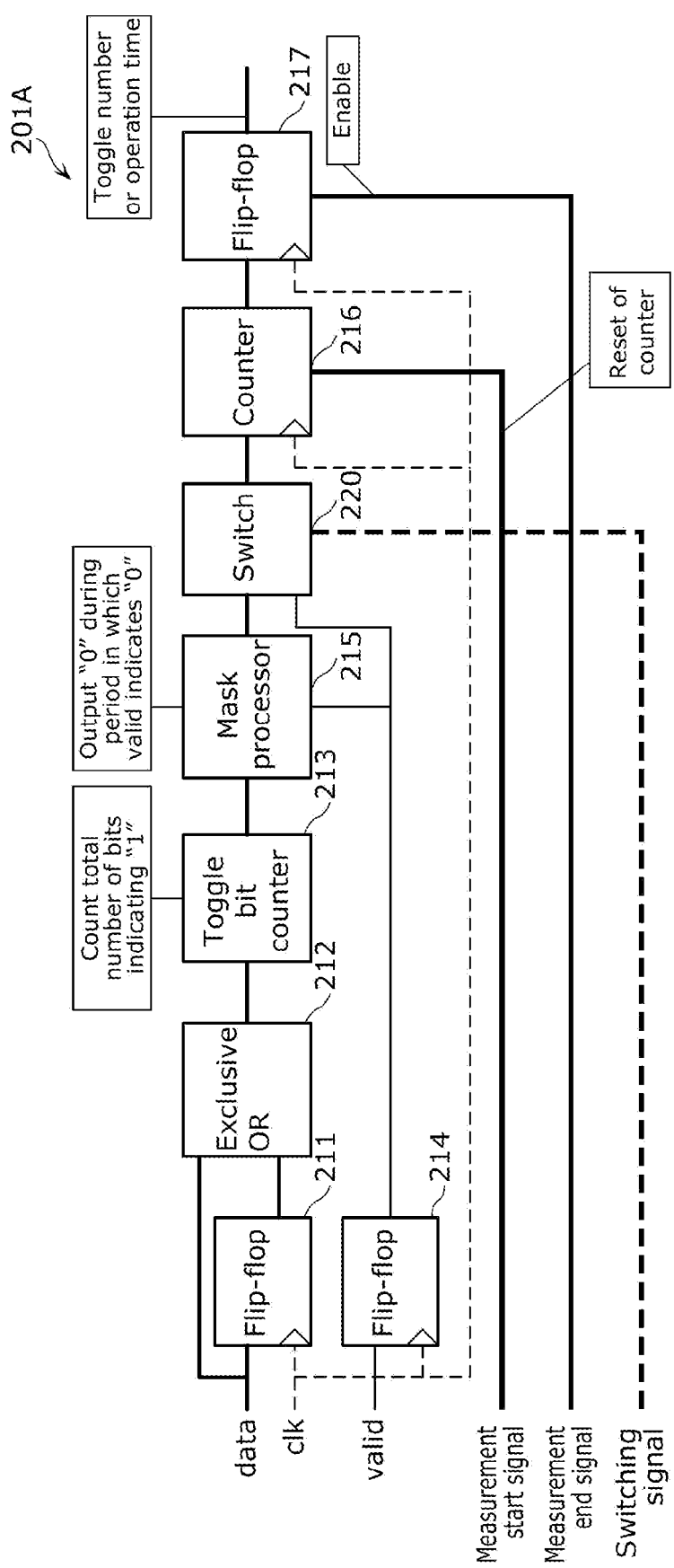
FIG. 6 is a block diagram illustrating one example of the configuration of a measurement circuit according to Variation 1.

FIG. 6 is a block diagram illustrating one example of the configuration of the measurement circuit according to Variation 1. Measurement circuit 201A may be used in place of any one of measurement circuits 201 to 206 in the embodiment.

When compared with measurement circuit 201 according to the embodiment, measurement circuit 201A according to Variation 1 differs in that measurement circuit 201A further includes switch 220 and does not include counter 218 and flip-flop 219. Measurement circuit 201A according to Variation 1 causes counter 216 and flip-flop 217 to function also as counter 218 and flip-flop 219 according to the embodiment. That is, measurement circuit 201A has a configuration in which a function of counting the toggle number and a function of counting the operation period are switched in a time division manner, and the functions are implemented with counter 216 and flip-flop 217 used in common. The description will be given mainly of differences.

Switch 220 switches between a first count mode and a second count mode in accordance with a switching signal. That is, switch 220 receives two inputs including the count result that is output from mask processor 215 and on which the masking process has been executed and the signal value of the valid signal output from flip-flop 214 in the first clock cycle, and selects one of the inputs in accordance with the switching signal.

Counter 216 counts the count result masked by mask processor 215 in a first measurement period that is the first count mode, and counts a period during which the signal being a measurement target is valid in a second measurement period that is the second count mode.

Flip-flop 217 outputs, as the toggle number, a result of counting valid bits counted by counter 216 in the first measurement period, and outputs, as the operation period, a result of counting a valid period counted by counter 216 in the second measurement period.

Accordingly, the counter that measures the toggle number and the counter that measures the operation period can be unified. As a result, a circuit size of electric power measurement circuit 100 can be reduced.

Variation 2

Electric power measurement circuit 100A according to Variation 2 will be described.

Figure 7:
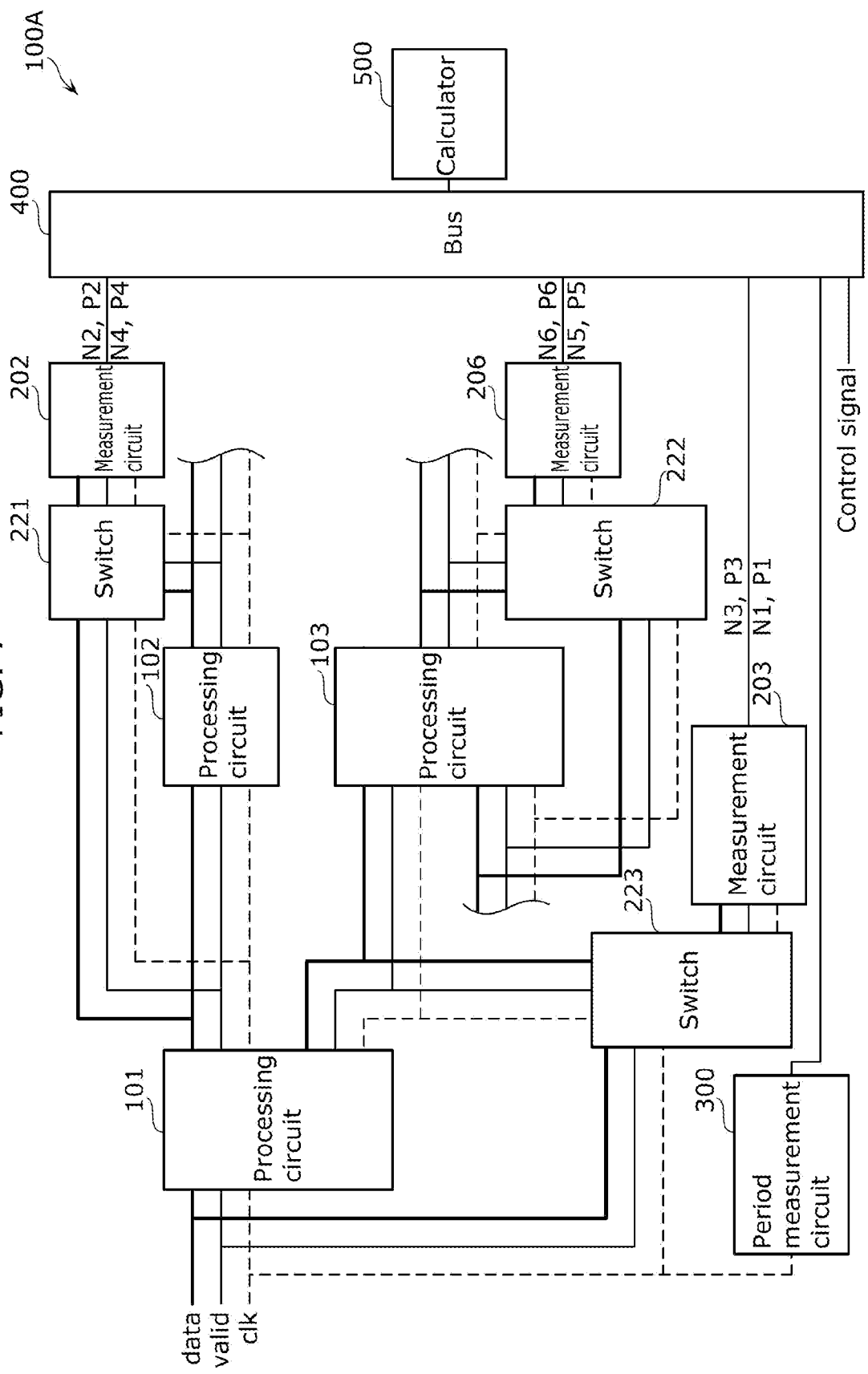
FIG. 7 is a block diagram illustrating one example of the configuration of an electric power measurement circuit according to Variation 2.

FIG. 7 is a block diagram illustrating one example of the configuration of the electric power measurement circuit according to Variation 2.

When compared with electric power measurement circuit 100 according to the embodiment, electric power measurement circuit 100A according to Variation 2 differs in that electric power measurement circuit 100A further includes switches 221 to 223 and does not include measurement circuits 201, 204, and 205. In electric power measurement circuit 100A according to Variation 2, measurement circuit 202 measures signals of processing circuit 102 on its input side and its output side by switching the signals with switch 221, measurement circuit 203 measures signals of processing circuit 101 on its input side and its output side on one system by switching the signals with switch 223, measurement circuit 206 measures signals of processing circuit 103 on its input side on one system and its output side by switching the signals with switch 222. That is, measurement circuits 202, 203, and 206 measure a plurality of signals (e.g., a signal on the input side and a signal on the output side) by switching between the signals with switches 221 to 223 in a time division manner. Each of switches 221 to 223 switches between a first operation mode of connecting a measurement circuit to which the switch is connected and an input side of a processing circuit being a measurement target by the measurement circuit and a second operation mode of connecting the measurement circuit and an output side of the processing circuit. The measurement circuit operates as a measurement circuit that measures a signal of the input side in the first operation mode and operates as a measurement circuit that measures a signal of the output side in the second operation mode.

The described example is such that a measurement circuit is connected to a circuit being a measurement target in such a manner that the measurement circuit is selectively connected to one of an input side and an output side of the circuit. However, this is not limiting. The measurement circuit may be connected to a processing circuit and another processing circuit in such a manner that the measurement circuit is selectively connected to one of an output side of the processing circuit and an output side of the other processing circuit. Alternatively, the measurement circuit may be connected to a processing circuit and another processing circuit in such a manner that the measurement circuit is selectively connected to one of an input side of the processing circuit and an input side of the other processing circuit.

In electric power measurement circuit 100A according to Variation 2, two measurement circuits can be unified into one measurement circuit. As a result, a circuit size of electric power measurement circuit 100A can be reduced.

Variation 3

Electric power measurement circuit 100B according to Variation 3 will be described.

Figure 8:
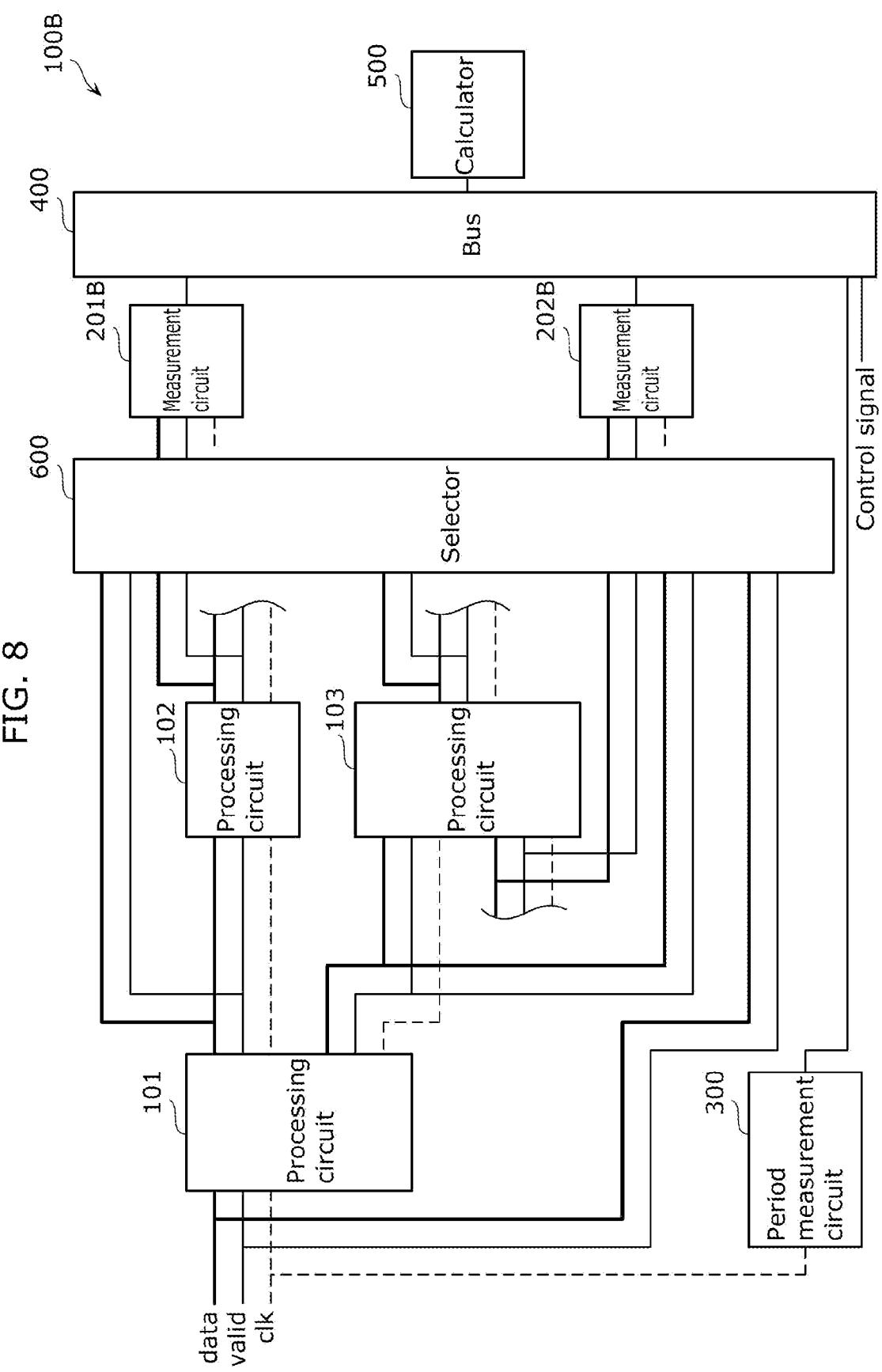
FIG. 8 is a block diagram illustrating one example of the configuration of an electric power measurement circuit according to Variation 3.

FIG. 8 is a block diagram illustrating one example of the configuration of the electric power measurement circuit according to Variation 3.

When compared with electric power measurement circuit 100 according to the embodiment, electric power measurement circuit 100B according to Variation 3 differs in that electric power measurement circuit 100B further includes selector 600 and includes two measurement circuits 201B and 202B. In electric power measurement circuit 100B according to Variation 3, a plurality (two in Variation 3, i.e., the number of measurement circuits) of signals to be measurement targets are selected by selector 600 that is connected to input sides and output sides of three processing circuits 101 to 103 and are output to measurement circuits 201B and 202B. Accordingly, measurement circuits 201B and 202B measure the signals selected, so that toggle numbers and operation periods of the signals can be obtained.

In this manner, selector 600 respectively connects, to two measurement circuits 201B and 202B, two measurement targets among input sides and output sides of processing circuits being a measurement target. That is, measurement circuits 201B and 202B can be made to have a function of measuring two signals being measurement targets selected from among the plurality of input sides and output sides. For example, by selecting an input side of processing circuit 102 and an output side of processing circuit 102, selector 600 can obtain a toggle number and an operation period of the input side and a toggle number and an operation period of the output side to calculate the power consumption of processing circuit 102 in the same measurement period. Therefore, it may be possible to calculate the power consumption of processing circuit 102 with high accuracy.

It is assumed that selector 600 selects any two signals from among the signals of the input sides and the signals of the output sides of three processing circuits 101 to 103 because electric power measurement circuit 100B according to Variation 3 includes two measurement circuits 201B and 202B. However, this is not limiting. Electric power measurement circuit 100B may include three or more (or one) measurement circuits, and selector 600 may select as many signals as the measurement circuits.

Other Embodiments

Although an electric power measurement circuit according to one or more aspects of the present disclosure has been described based on an embodiment described above, the present disclosure is not limited to the embodiment. Other embodiments obtained by various modifications of the embodiment that may be conceived by persons skilled in the art so long as they do not depart from the essence of the present disclosure are also included in the present disclosure.

While an embodiment has been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The present application is based on and claims priority of Japanese Patent Application No. 2023-011906 filed on Jan. 30, 2023.

INDUSTRIAL APPLICABILITY

The present disclosure is useful as, for instance, an electric power calculation circuit capable of calculating power consumption in a specific processing circuit in an integrated circuit.

The invention claimed is:

1. An electric power measurement circuit that calculates power consumption in an integrated circuit including a plurality of processing circuits, the electric power measurement circuit comprising:
a period measurement circuit that measures a measurement period;
a first measurer that measures, in the measurement period,
(i) a first toggle number that is a number by which a signal value indicated by a first input signal to a first target circuit among the plurality of processing circuits has changed and (ii) a first operation period that is a period during which the first input signal is valid;

a second measurer that measures, in the measurement period, (i) a second toggle number that is a number by which a signal value indicated by a first output signal from the first target circuit has changed and (ii) a second operation period that is a period during which the first output signal is valid; and a calculator that calculates a first power consumption of the first target circuit based on the first toggle number and the first operation period measured in the measurement period by the first measurer and the second toggle number and the second operation period measured in the measurement period by the second measurer.

2. The electric power measurement circuit according to claim 1, further comprising:

a third measurer that measures, in the measurement period, (i) a third toggle number that is a number by which a signal value indicated by a second input signal to a second target circuit among the plurality of processing circuits has changed and (ii) a third operation period that is a period during which the second input signal is valid; and a fourth measurer that measures, in the measurement period, (i) a fourth toggle number that is a number by which a signal value indicated by a second output signal from the second target circuit has changed and (ii) a fourth operation period that is a period during which the second output signal is valid, wherein the calculator calculates also a second power consumption of the second target circuit based on the third toggle number and the third operation period measured in the measurement period by the third measurer and the fourth toggle number and the fourth operation period measured in the measurement period by the fourth measurer.

3. The electric power measurement circuit according to claim 1, further comprising:

a fourth measurer that measures, in the measurement period, (i) a fourth toggle number that is a number by which a signal value indicated by a second output signal from a second target circuit has changed and (ii) a fourth operation period that is a period during which the second output signal is valid, the second target circuit being a circuit to which the first output signal is input as an input signal among the plurality of processing circuits, wherein the calculator calculates also a second power consumption of the second target circuit based on the second toggle number and the second operation period measured in the measurement period by the second measurer and the fourth toggle number and the fourth operation period measured in the measurement period by the fourth measurer.

4. The electric power measurement circuit according to claim 1, wherein the period measurement circuit includes:

a counter that when a clock signal and a measurement start signal are input to the period measurement circuit, counts the clock signal after the measurement start signal has been input; and a first outputter that when the clock signal, a count result obtained by the counter, and a measurement end signal are input to the period measurement circuit, outputs, as the measurement period, the count result at a point in time when the measurement end signal is input to the period measurement circuit.

5. The electric power measurement circuit according to claim 1, wherein each of the first measurer and the second measurer includes:

a holding circuit that holds a first signal value that is a signal value of the first input signal or the first output signal in a first clock cycle;

a toggle bit counter that counts a total number of bits that are different between the first signal value and a second signal value, the second signal value being a signal value of the first input signal or the first output signal in a second clock cycle following the first clock cycle;

a mask processor that executes a masking process on a count result indicating that the first input signal or the first output signal is invalid among count results obtained by the toggle bit counter;

a valid bit counter that counts the count result on which the masking process is executed by the mask processor;

a valid period counter that counts a period during which the first input signal or the first output signal is valid; and a second outputter that outputs, as the first toggle number or the second toggle number, a result of counting valid bits by the valid bit counter and outputs, as the first operation period or the second operation period, a result of counting a valid period by the valid period counter.

6. The electric power measurement circuit according to claim 1, wherein each of the first measurer and the second measurer includes:

a holding circuit that holds a first signal value that is a signal value of the first input signal or the first output signal in a first clock cycle;

a toggle bit counter that compares the first signal value with a second signal value that is a signal value of the first input signal or the first output signal in a second clock cycle following the first clock cycle, and counts a total number of bits that are different between the first signal value and the second signal value;

a mask processor that executes a masking process on a count result indicating that the first input signal or the first output signal is invalid among count results obtained by the toggle bit counter;

a first switch that switches between a first count mode and a second count mode;

a validity counter that counts the count result masked by the mask processor in a first measurement period that is the first count mode, and counts a period during which the first input signal or the first output signal is valid in a second measurement period that is the second count mode; and a second outputter that outputs, as the first toggle number or the second toggle number, a result of counting valid bits by the validity counter in the first measurement period, and outputs, as the first operation period or the second operation period, a result of counting a valid period by the validity counter in the second measurement period.

7. The electric power measurement circuit according to claim 1, wherein
the first measurer and the second measurer are included in a first measurement circuit,
the electric power measurement circuit further comprises:
a second switch that switches between a first operation mode of connecting the first measurement circuit and an input side of the first target circuit and a second operation mode of connecting the first measurement circuit and an output side of the first target circuit, and
the first measurement circuit operates as the first measurer in the first operation mode and operates as the second measurer in the second operation mode.

8. The electric power measurement circuit according to claim 1, further comprising:
a third measurer that measures, in the measurement period, (i) a third toggle number that is a number by which a signal value indicated by a second input signal to a second target circuit among the plurality of processing circuits has changed and (ii) a third operation period that is a period during which the second input signal is valid; and
a fourth measurer that measures, in the measurement period, (i) a fourth toggle number that is a number by which a signal value indicated by a second output signal from the second target circuit has changed and (ii) a fourth operation period that is a period during which the second output signal is valid, wherein
two measurers among the first measurer, the second measurer, the third measurer, and the fourth measurer are respectively included in a first measurement circuit and a second measurement circuit,
the electric power measurement circuit further comprises:
a selector that respectively connects, to the first measurement circuit and the second measurement circuit, two measurement targets among an input side of the first target circuit, an output side of the first target circuit, an input side of the second target circuit, and an output side of the second target circuit, and
the first measurement circuit and the second measurement circuit operate as measurers that measure the two measurement targets selected by the selector.

* * * * *